US011496856B2

(12) United States Patent
Sarma et al.

(10) Patent No.: US 11,496,856 B2
(45) Date of Patent: Nov. 8, 2022

(54) ASSESSING SPATIAL MOVEMENT BEHAVIOR

(71) Applicant: Hewlett-Packard Development Company, L.P., Spring, TX (US)

(72) Inventors: Madhurya Sarma, Pune (IN); Mengqi Hei, Spring, TX (US); Aravind Iyengar, Spring, TX (US); Gaurav Roy, Spring, TX (US); Amit Kumar Singh, Spring, TX (US); Siddhesh Arolkar, Pune (IN); Chetan Satpute, Pune (IN); Sumit Raut, Pune (IN); Sakshi Kandya, Pune (IN); Nileshkumar Gawali, Pune (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,452

(22) PCT Filed: Oct. 4, 2019

(86) PCT No.: PCT/US2019/054689
§ 371 (c)(1),
(2) Date: Oct. 14, 2020

(87) PCT Pub. No.: WO2020/076628
PCT Pub. Date: Apr. 16, 2020

(65) Prior Publication Data
US 2021/0227350 A1    Jul. 22, 2021

(51) Int. Cl.
*H04W 4/02* (2018.01)
*H04W 4/029* (2018.01)
(Continued)

(52) U.S. Cl.
CPC .......... *H04W 4/023* (2013.01); *G06K 9/6223* (2013.01); *G06N 20/00* (2019.01); *H04W 4/021* (2013.01); *H04W 4/025* (2013.01); *H04W 4/029* (2018.02)

(58) Field of Classification Search
CPC ..... H04W 4/023; H04W 4/029; H04W 4/021; H04W 4/025; G06N 20/00; G06K 9/6223
See application file for complete search history.

(56) References Cited

U.S. PATENT DOCUMENTS

| 8,442,447 B2 | 5/2013 | Veluppillai et al. |
| 8,755,824 B1 | 6/2014 | Wang et al. |

(Continued)

FOREIGN PATENT DOCUMENTS

| CN | 105430099   | 3/2016 |
| EP | 2 395 794 B1 | 6/2014 |
| EP | 2395794     | 6/2014 |

OTHER PUBLICATIONS

Antoniou, C. et al., "Classification of driving characteristics using smartphone sensor data," 3rd Symposium of the European Association for Research in Transportation, Extended Abstract Submitted to: hEART 2014, pp. 1-9.
(Continued)

*Primary Examiner* — Umair Ahsan
(74) *Attorney, Agent, or Firm* — HP Inc. Patent Department

(57) ABSTRACT

The present subject matter relates to techniques of assigning a mobility factor to the user based on the spatial movement data. In one example, the technique may include four phases for assigning the mobility factors to the users. In a first phase, spatial movement data from a plurality of user devices assigned to a plurality of users may be received. In a second phase, spatial movement behavior for a set of user devices may be assessed using the received spatial move-
(Continued)

ment data of the members of the set using machine learning techniques. In a third phase, user devices may be selected based on the assessed spatial movement behavior using machine learning techniques for reconfiguration. Finally, at a four phase, the selected user devices may be reconfigured.

19 Claims, 5 Drawing Sheets

(51) Int. Cl.
*G06N 20/00* (2019.01)
*G06K 9/62* (2022.01)
*H04W 4/021* (2018.01)

(56) References Cited

U.S. PATENT DOCUMENTS

| | | | | |
|---|---|---|---|---|
| 9,065,727 | B1* | 6/2015 | Liu | G06Q 30/06 |
| 2008/0125959 | A1* | 5/2008 | Doherty | G06F 16/29 |
| | | | | 701/532 |
| 2009/0247137 | A1* | 10/2009 | Awad | H04M 3/2227 |
| | | | | 455/418 |
| 2014/0180583 | A1 | 6/2014 | Doherty et al. | |
| 2015/0296404 | A1 | 10/2015 | Sharma et al. | |
| 2016/0066252 | A1 | 3/2016 | Parron et al. | |
| 2017/0206559 | A1* | 7/2017 | Bakshi | H04L 67/22 |
| 2017/0230248 | A1* | 8/2017 | Broch | H04W 12/084 |
| 2020/0058037 | A1* | 2/2020 | Funkhouser | G06Q 30/0201 |

OTHER PUBLICATIONS

Giannotti, F. et al., "Big data driven theories of mobility demand," Research Paper, Published on Aug. 31, 2013, 60 pgs.

M. Sangeetha, et al., "Genetic optimization of hybrid clustering algorithm in mobile wireless sensor networks," Sensor Review, vol. 38, Issue 4, Jan. 4, 2018, 9 pgs.

* cited by examiner

ASSESSING SPATIAL MOVEMENT BEHAVIOR

BACKGROUND

Enterprises generally employ a number of personnel for discharge of various operations of the enterprises. Such personnel may travel to various locations in an effort to carry out the operations. The enterprises may provide the personnel with various resources, including user devices, discharging work. The user devices can be a mobile phone, a laptop, a handheld PC, or the like. Further, based on an extent of the travel, the personnel may be provided with peripherals, such as a charger to allow the personnel to charge the user device.

BRIEF DESCRIPTION OF FIGURES

The detailed description is provided with reference to the accompanying figures, wherein.

DETAILED DESCRIPTION

Figure 1:
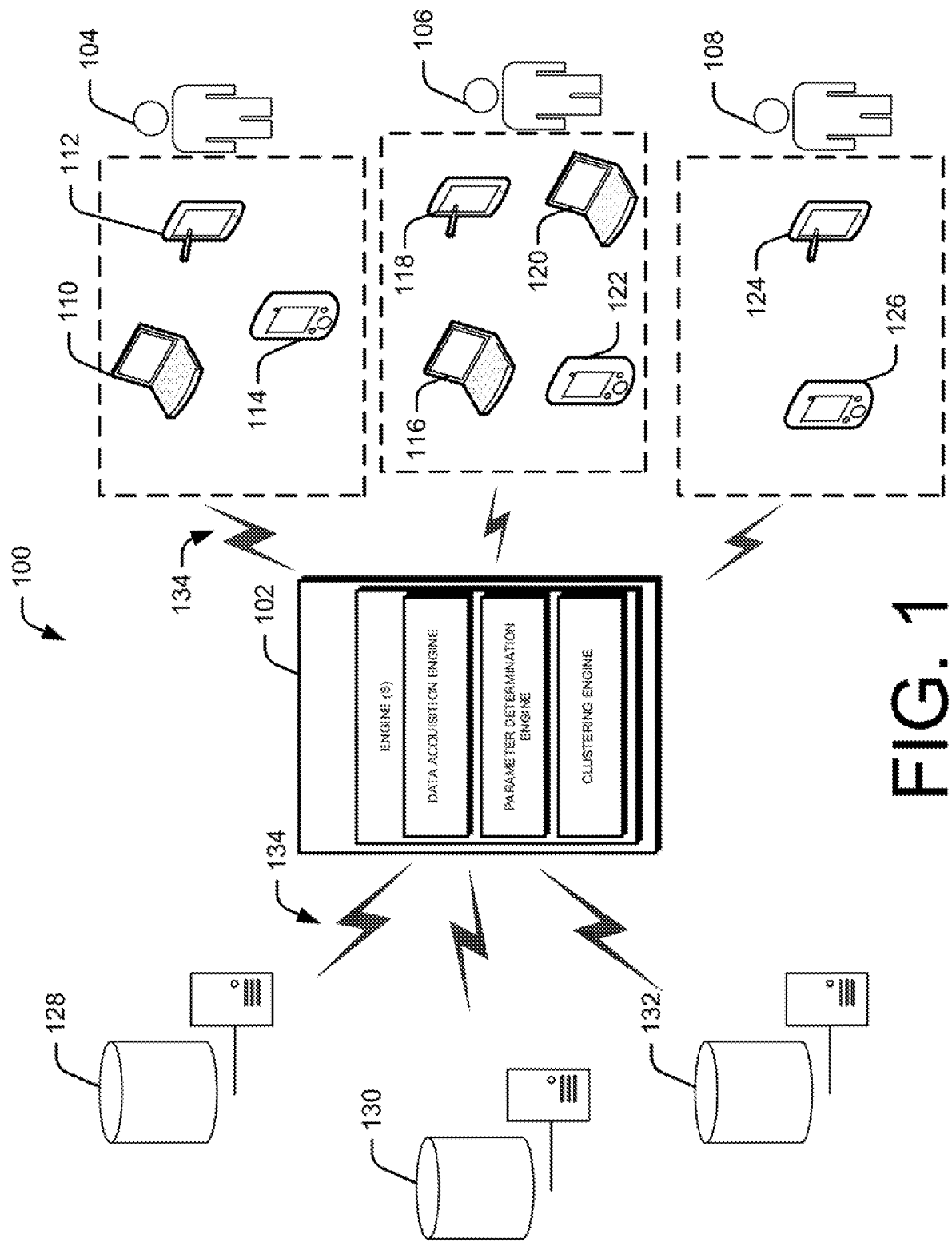
FIG. 1 illustrates an example of a network environment employing a system for assigning mobility factor.

Personnel employed in an enterprise may travel for work and accordingly, the enterprise may provide the personnel with a variety of user devices to facilitate the work of the personnel. The personnel may face situations where the user device may not operate in such situations. In such cases, the personnel may be stuck in with the user device that may not work. In one example, the personnel travelling for the work may face situations where the personnel may be unable to locate a charging port to charge the user device or the personnel may not be able to provide adequate charging time for the user device owing to time constraints. The non-availability of charging port and inadequate charging time may cause the batteries of the user device to degrade early. In addition, constant use of the user device under inadequate charging also adds to the degradation of the battery. Such degradation may result in frequent replacement of the battery packs. In addition, battery degradation may result in downtime of the user device that may also affect the work and productivity of the personnel. In addition, the user device assigned to the personnel that travel more is more prone to damage due to travelling. For example, a user device, such as a laptop may suffer damages during frequent travel of the personnel to whom the user device is assigned and such damage may result in damage to the hard disk. Further, the damage to the hard disk may result in data loss. As a result, the user devices may need frequent replacement due to damage. Such damages further add to the operational cost of the enterprises. The enterprises may not able be to allocate appropriate resources to the personnel that may affect the productivity of the personnel as well as the productivity of the enterprise.

Examples of techniques for assessing a spatial movement behavior of a user device and reconfiguring the user device based on the assessed spatial movement behavior are described. In one example, the spatial movement behavior can be a pattern of travel of the user device. In an example, a mobility factor can be assigned that may be indicative of the spatial movement behavior of the user device. The techniques based on the present subject matter may use machine learning to assess a spatial movement behavior of a user, and allocate the mobility factor based on the spatial movement behavior of the user device. In one example, the user having multiple different type of user devices will have multiple mobility factor for each type of user device assigned to the user. In addition, the techniques based on the present subject matter may allow reconfiguration of the user device based on the accessed spatial movement behavior. The techniques based on the present subject matter may use spatial movement data transmitted by the user device that the user is carrying. The technique may deduce multiple spatial movement parameters associated with each user device, such as length of trips taken, the frequency of trips, or how far the user device has travelled. Based on the deduced parameters, the machine learning techniques may be employed to determine the mobility factor for each user device. Once the mobility factors are determined, the user devices can be reconfigured based on the mobility factor.

According to an example, the technique may operate in four phases. In a first phase, spatial movement data from a plurality of user devices assigned to a plurality of users may be received. In a second phase, spatial movement behavior for a set of user devices may be assessed using the received spatial movement data of the members of the set of user devices using machine learning techniques. In a third phase, user devices may be selected based on the assessed spatial movement behavior using machine learning techniques for reconfiguration. Finally, at a four phase, the selected user devices may be reconfigured based on the assessed spatial movement behavior.

In the first phase, a dataset is created using spatial movement data of the user device associated with all the user devices assigned to the users. In one example, the location information may include the spatial movement data of the user devices along with time stamps of transmission of the spatial movement data, for each user device in the dataset. For instance, the spatial movement data can be latitudinal and longitudinal coordinates. Further, the user device may transmit the spatial movement data at a predetermined time interval, and the transmitted spatial movement data may be collected for a predefined time period.

Once the dataset is created, the user devices may be identified for further analysis and a set of such identified user devices can be derived from the dataset. Accordingly, the dataset may be screened to filter out, for example, users that may not be relevant for the spatial movement behavior analysis, such that a set of user devices remains. For instance, the dataset may be screened in order to eliminate users that may not be relevant to the analysis. In order to filter the set, a number of predefined rules may be applied. In one example, the predefined rules to filter the set of user devices may include most number of user device associated with the user. Further, rule of predefined number of user devices associated with the user may be applied to exclude the user devices that are not used yet they are associated to the user. Another predefined rule can be most number of same type of user devices associated with the user. This predefined rule may be applied to prevent redundant analysis of similar user devices. Yet another predefined rule is a minimum number of spatial movement data gathered for the predetermined time period. This predefined rule may be applied to ensure that an adequate amount of spatial movement data is available for further analysis. Finally, another predefined rule can be that there should not be an overlap of time period of transmission of the location information transmitted by same of type user devices assigned to same user. This rule may be applied to filter out the user that are not relevant to the analysis.

In the second phase, the set of user devices may be further analyzed to determine the mobility factor associated with members of the set of the user devices. In one example, a plurality of parameters may be determined for members of the set of the user devices, based on the spatial movement data of the members. Further, each of the plurality of parameters may have a bearing on the spatial movement behavior of the user. In one example, the parameters may include geo-location partitions that includes different sets of regions that the user has travelled more. In other examples, the parameter can be total distance travelled by the user. Yet another example of parameter may can be a longest single trip taken by the user. In addition, as example, the parameter can be an area within which the user has travelled in the predetermined time period.

According to an example, spatial movement behavior of the members of the set of the user devices may be accessed. In one example, the spatial movement behavior may be assessed by determining the mobility factor based on the determined parameters for each user device. In one example, machine learning techniques may be applied to assess the spatial movement behavior and to determine the mobility factor based on the parameters. In other words, the machine learning techniques may be used for categorizing the user devices as being mobile or stationary. In addition, the user device may be categorized as being either more mobile than other user devices. In one example, the spatial movement behavior may be assessed by forming number of different sets of clusters of the members of the user devices and determining a cost associated with each cluster based on the members in the clusters. In one example, the cost may be indicative of an amount associated with the travel of the user device. Further, the associated cost may be calculated using the parameters of the user devices. Once the costs are calculated, an overall cost of each seat of clusters may be calculated. Once the overall cost is calculated, the duster set that has the lowest overall cost may be selected and a comparison between dusters in the selected set of clusters may indicate spatial movement behavior.

In one example, the based on the determined cost, the mobility factor may be assigned to the members in the clusters. As mentioned previously, the mobility factor may be an indication of the spatial movement behavior of the members. For example, a relatively high mobility factor indicates that the user device is associated with a user who travels more than other users having user devices with lower mobility factor. In third phase, the user devices may be selected based on the assigned mobility factor for reconfiguration. In one example, the user devices are selected if their assigned mobility factor is above a predefined threshold. Once the user devices are selected, the selected devices may be reconfigured to change a state of the operation based on the spatial movement behavior or the mobility factor. For example, the user device with high mobility factor may be reconfigured to operate in a state of operation in which the user device consumes less power.

The technique based on the present subject matter allows for automatic configuration of a state of operation of the user device based on the spatial movement behavior. Since the user devices can be reconfigured on the fly, the user device may cater the work of the user as per the user's need. In addition, the techniques of the present subject matter may also allow for appropriate distribution of the user device to the users based on their spatial movement behavior. Further, since the user device is assigned based on user's spatial movement behavior, cost associated with the allocation of the resources is reduced. Such an allocation of the user device may enhance the productivity of the user because the user may be provided with the appropriate user device that may cater the need of the user.

FIG. 1 illustrates a network environment 100 employing a behavior recognition system 102 for assigning mobility factors to a plurality of users 104, 106, 108 . . . and so on, based on machine learning. Although the present example illustrates three users, the behavior recognition system 102 may assess spatial movement behavior of more than three users. Further, the users 104, 106, and 108 may be provided with a plurality of user devices 110, 112, . . . 126. In one example, the first user 104 may be provided with user devices 110, 112, and 114. Similarly, the second user 106 may be provided with the user devices 116, 118, 120, and 122. Further, the third user 108 may be provided with the user devices 124 and 126. In one example, the user devices 110-126 can be portable and can be of different types. For instance, the user devices 110-126 can be of same type or different type. For instance, the user devices 110-126 can be a mobile phone, a laptop, a handheld PC, or the like. Further, the user devices 110-126 may have different states of operation, such as a first mode of operation and a second mode of operation. In one example, the first state can be normal operation mode while the second state is a power saving mode in which the user device is configured to operate the user device in a manner to save the battery. In another example, the user device may be reconfigured to switch a wireless adapter ON or OFF thereby enabling or disabling the wireless connectivity of the user device with a wireless network. In addition, the user device may be configured to prevent the user device to connect to insecure wireless network or may restrict connectivity of the user device with external peripherals.

According to an example, the user device 110-126 may communicate with the behavior recognition system 102 to provide location information of the user devices 110-126 to the behavior recognition system 102. The location information may include spatial movement data. In one example, the spatial movement data can be geographical coordinate. Further, each user device 110-126 may relay the spatial movement data to the behavior recognition system 102 along with the date and time of transmission at a predetermined interval. In another example, the user device 110-126 may transmit the spatial movement data upon occurrence of an event. The event can be entrance of the user device 110-126 at a predetermined location. In another example, the event can be exit of the user device from the predetermined location. Either case, the user device 110-126 may relay the spatial movement data to the behavior recognition system 102.

According to an example, the network environment 100 may include a spatial movement database 128 in communication with the behavior recognition system 102 that may store the spatial movement data of the user devices 110-126 received by the behavior recognition system 102. Although the spatial movement database 128 is shown external to the behavior recognition system 102, the spatial movement database 128 can be internal to the behavior recognition engine 102. In one example, the spatial movement data may be populated in the form of an array that includes entries of each user device 110-126, details of the user to whom the user device is provided, and spatial movement data along with the date and time of transmission of the spatial movement data. The network environment 100 may also include a parameter database 130 that may store a plurality of parameters that the based on the spatial movement data of the user devices 110-126.

The network environment 100 may include a mobility factor database 132 that may store mobility factor for the user devices 110-126 allocated to the user 104, 106, and 108. In one example, the behavior recognition system 102 may determine the mobility factor based on the plurality of parameters stored in the parameter database 130.

According to an example, the behavior recognition system 102 may communicate with the user devices 110-126 and databases over a communication network 134. The communication network 134 may be a wireless network, a wired network, or a combination thereof. The communication network 134 can also be an individual network or a collection of many such individual networks, interconnected with each other and functioning as a single large network, e.g., the Internet or an intranet. The communication network 134 can be employed as one of the different types of networks, such as intranet, local area network (LAN), wide area network (WAN), the Internet, and such. The communication network 134 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the communication network 134 may include network devices, such as network switches, hubs, routers, for providing a link between the behavior recognition system 102 and the user devices 110-126. The network devices within the communication network 134 may interact with the behavior recognition system 102 and the user devices 110-126 and the databases 128-132 through the communication links.

In operation, the behavior recognition system 102 may receive location information from the plurality of user devices 110-126 at the predetermined interval. In one example, the location information can be spatial movement data of the user devices 110-126. Thereafter, the behavior recognition system 102 may store the spatial movement data in the spatial movement database 128 for further processing. The behavior recognition system 102 may further process the spatial movement data to obtain a plurality of parameters. Further, each of the plurality of parameters is indicative of the spatial movement behavior of the user devices 110-126. Once the behavior recognition system 102 has generated the plurality of parameters, the behavior recognition system 102 may employ machine learning techniques to assign mobility factors to the user. In one example, the behavior recognition system 102 may form clusters of users and thereafter, the behavior recognition system 102 may assign mobility factor to each cluster. As an example, the operation of the behavior recognition system 102 is explained in detail with respect to FIG. 2 and FIG. 3.

Figure 2:
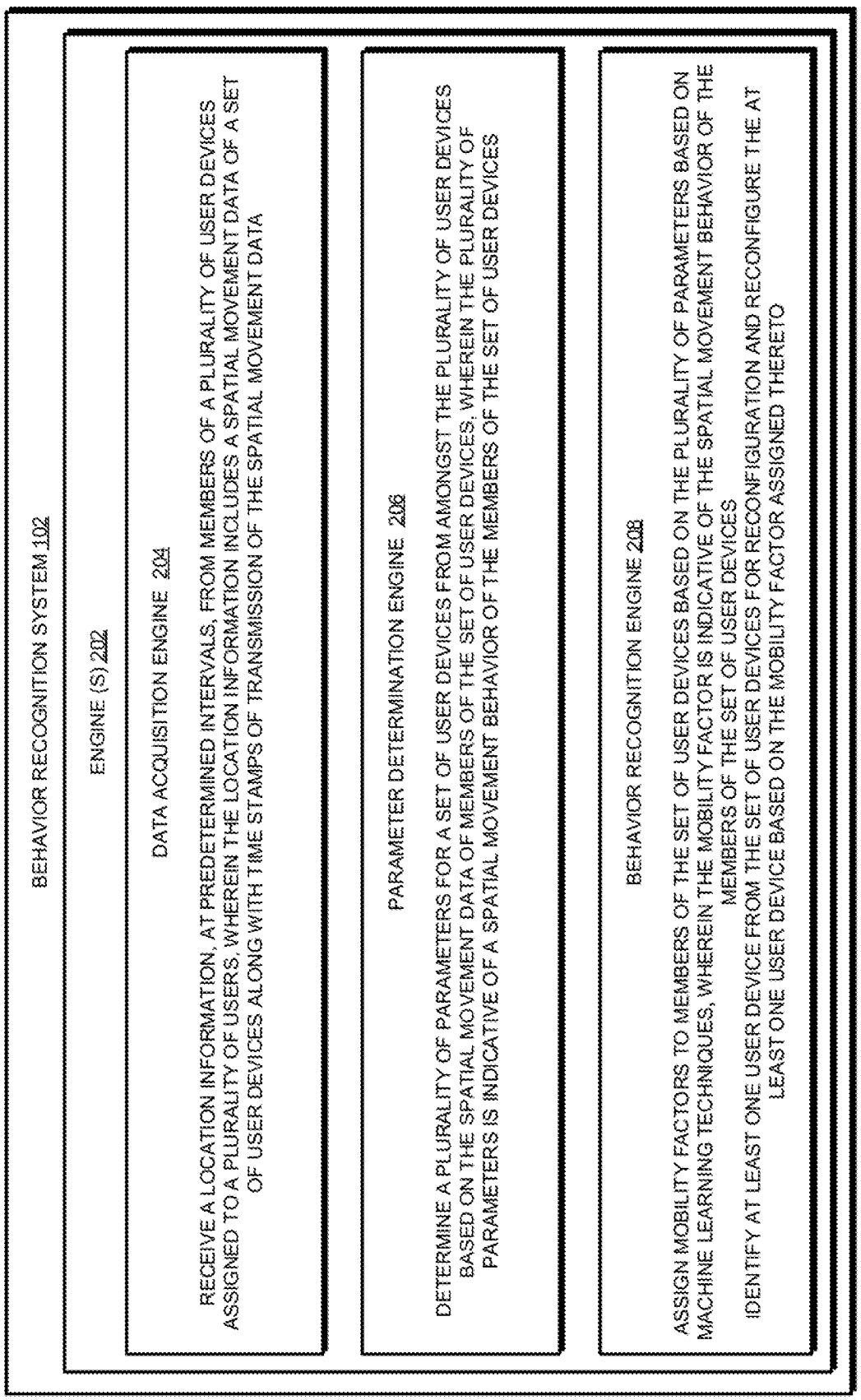
FIG. 2 illustrates the system for assigning mobility factor, according to an example.

FIG. 2 illustrates the behavior recognition system 102 for assigning mobility factors to a plurality of users based on the users' spatial movement behavior, according to an example. The behavior recognition system 102 may include, for example, engines 202. The engines 202 are employed as a combination of hardware and programming (for example, programmable instructions) to use functionalities of the engines 202. In examples described herein, such combinations of hardware and programming may be used in a number of different ways. For example, the programming for the engines 202 may be processor executable instructions stored on a non-transitory machine-readable storage medium and the hardware for the engines 202 may include a processing resource (for example, processors), to execute such instructions. In the present examples, the machine-readable storage medium stores instructions that, when executed by the processing resource, deploy engines 202. In such examples, behavior recognition system 102 may include the machine-readable storage medium storing the instructions and the processing resource to execute the instructions: or the machine-readable storage medium may be separate but accessible to the behavior recognition system 102 and the processing resource. In other examples, engines 202 may be deployed using electronic circuitry.

The engine 202 may include a data acquisition engine 204 that may receive a location information from each all the members of plurality of user devices 110-126 assigned to a plurality of users at predetermined intervals. In one example, the location information may include the spatial movement data of the user devices 110-126 transmitted along with time stamps of transmission of the spatial movement data. Further, the data acquisition engine 204 may store the spatial movement data in the spatial movement database 128. The behavior recognition system 102 may also include a parameter determination engine 206 that may determine a plurality of parameters for a set of user devices from the amongst the plurality of user devices 110-126 (shown in FIG. 1). Further, the determined parameters may be indicative of the spatial movement of the members of the set of user devices. In one example, parameters may include, as example, number of geo-location partitions, total distance travelled by the user, longest single trip taken by the user, area and parameters within which the user device has travelled within the predetermined time period. Further, the parameters can be indicative of the spatial movement behavior of the user device. Details of each parameter will be explained in detail with respect to FIG. 3.

According to an example, the behavior recognition system 102 may include a behavior recognition engine 208 that may assess the spatial movement behavior of the members of the set of user devices. In one example, the behavior recognition engine 208 may assign a mobility factor to members of the user devices based on the plurality of parameters of each member such that the mobility factor indicates the spatial movement behavior of the member. The behavior recognition engine 208 may use machine learning techniques to determine the mobility factor for the members of the set of user devices. In addition, the behavior recognition engine 208 may also identify the user devices from the set for reconfiguration based on the assigned mobility factor. Further, the behavior recognition engine 208 may reconfigure the identified user devices based on the assigned mobility factor. A manner by which the behavior recognition engine 208 reconfigures the identified user devices is explained with respect to FIG. 3.

Figure 3:
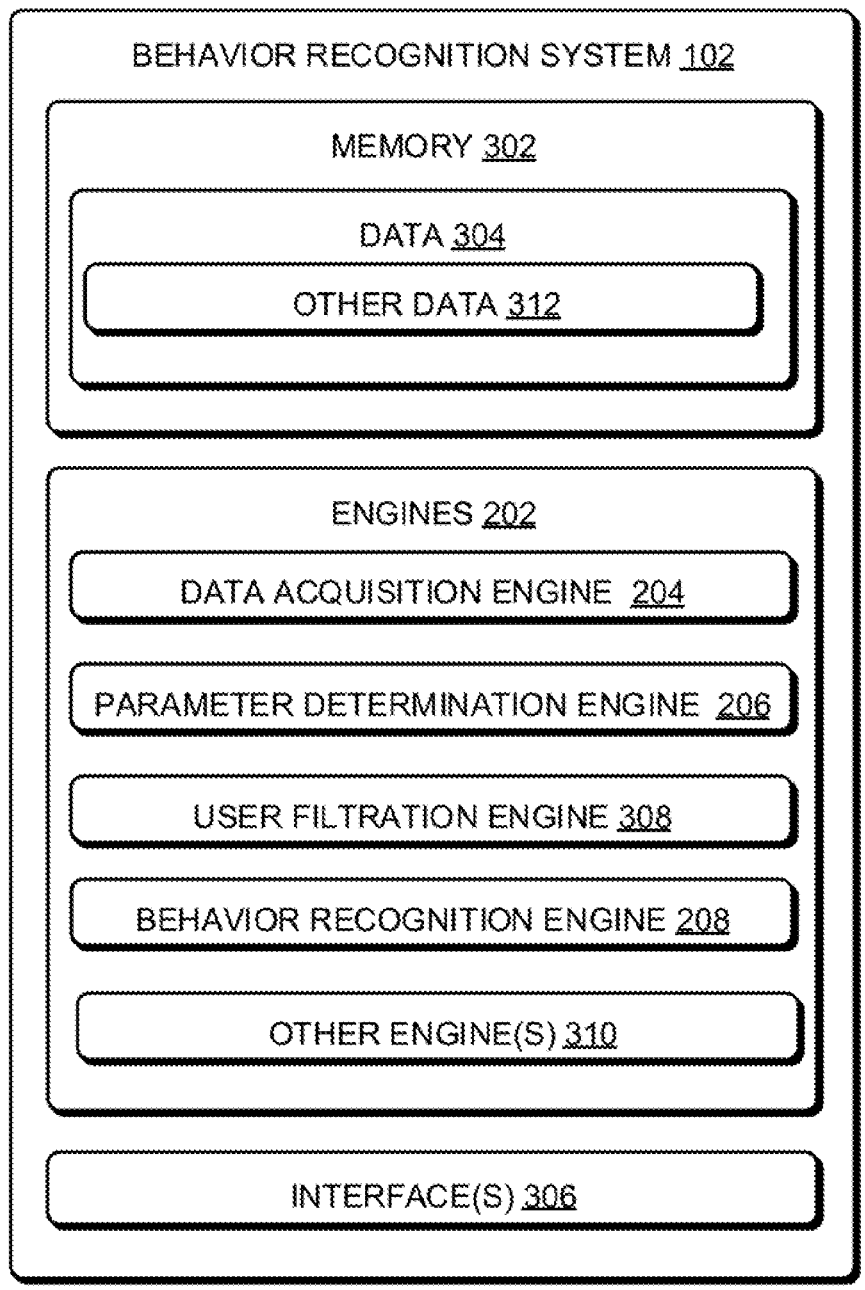
FIG. 3 illustrates a detailed schematic of the system for assigning mobility factor, according to an example.

FIG. 3 illustrates a detailed schematic of the behavior recognition system 102 to the assign mobility factor showing various components of the behavior recognition system 102, according to an example of the present subject matter. The behavior recognition system 102, among other things and in addition to the engines 202, a memory 302 having data 304, and interface(s) 306. The engines 202, among other capabilities, may fetch and execute computer-readable instructions stored in the memory 302. The memory 302, communicatively coupled to the engines 202, may include a non-transitory computer-readable medium including, for example, volatile memory, such as Static Random-Access Memory (SRAM) and Dynamic Random-Access Memory (DRAM), and/or non-volatile memory, such as Read-Only-Memory (ROM), erasable programmable ROM, flash memories, hard disks, optical disks, and magnetic tapes.

In an example, in addition to the data acquisition engine 204, the parameter determination engine 206, and the behavior recognition engine 208 the engines 202 may include a user filtration engine 308, behavior recognition engine 208 and other engine(s) 310. The other engine(s) 310 may provide functionalities that supplement applications or functions performed by the behavior recognition system 102.

Further, the data 304 includes data that is generated as a result of the functionalities carried out by any of the engines 202. The data 304 may include other data 312. The other data 312 may include data generated and saved by the engines 202 to provide various functionalities to the behavior recognition system 102.

As explained previously, the behavior recognition, system 102 works in four phases. In the first phase, the behavior recognition system 102 may receive spatial movement data from the user devices that are assigned to the users. In the second phase, the behavior recognition system 102 may assess the spatial movement behavior of a set of user devices using the spatial movement data of the members of the set. In the third phase, user devices may be selected for reconfiguration based on the assigned mobility factor. Finally, in the fourth phase, the selected user devices may be reconfigured.

In one example, the data acquisition engine 204, in order to assess the spatial movement behavior, may collect spatial movement data of the user devices 110-126, The data acquisition engine 204 may create a dataset to store the spatial movement data that the data acquisition engine 204 may acquire from the user devices 110-126. In one example, the dataset may look like a two-dimensional array that includes, for each user, individual rows for the user devices allocated to the users. Further, for each row, the dataset includes additional details in separate columns, such as a user ID associated with the user, a user device type, geographical coordinates of the user devices, and date and time of the transmission of the geographical coordinates. In one example, the data acquisition engine 204 may associate an identifier to the user devices for storing the spatial movement data. The identifier can be used to identify the user device associated with the user. In one example, the identifier can be a representative for the spatial movement data having an enterprise ID, a user ID, and a type of user device in the dataset. Further, the identifier can be a combination of two or more of the enterprise ID, the user ID, and the type of user device. In one example, the dataset may be created using the spatial movement data received for over a period of last 90 days.

In one example, the data acquisition engine 204 may store the spatial movement data of the user devices 110-126 in such a manner that there is no redundancy in the spatial movement data to prevent erroneous calculation of the parameters for the users. For instance, if the user devices 110-126 transmit spatial movement data having same geographical coordinates, then the data acquisition engine 204 may compare the immediately preceding spatial movement data with the subsequently received spatial movement data to determine whether the subsequent spatial movement data is redundant or not in view of immediately preceding spatial movement data. The data acquisition engine 204 may do so to prevent redundant spatial movement data being stored. Once the dataset is created, the dataset can be accessed by the user filtration engine 308 for further analysis on the dataset.

According to an example, the user filtration engine 308 may access the spatial movement database 128 to access the dataset. The user filtration engine 308 may filter a set of whitelisted user devices from the dataset based on pre-defined rules for further analysis. In one example, one predetermined rule can be a least number of user devices assigned to one user. For instance, the user filtration engine 308 may disregard the spatial movement data of those user devices where more than five user devices are associated to one user. This rule is applied to remove the users that have additional spatial movement data associated thereto that can affect in assessing the spatial movement behavior. There may be cases where the user may have multiple user devices associated thereto and such user devices may be given to the users. In such cases, behavior recognition system 102 may determine the mobility factors of the user even when that user is not using the user device. Such situations may be prevented by limiting the users based on the number of devices associated with the user.

Another predetermined rule that the user filtration engine 308 may employ is that there should not be an overlap of spatial movement data of the user devices having similar attributes assigned to one user. In one example the attribute can be same type of user devices. There may be cases where the user is provided with two or more user devices of same type. In such cases, the user filtration engine 308 may check if the spatial movement data of two similar device is not similar. For example, the user filtration engine 308 may check if there is an overlap of the time periods for which the same type of user devices assigned to the user have transmitted geographical coordinates. In case the user filtration engine 308 determines that there is an overlap in the time period, the user filtration engine 308 may filter out all the user devices of assigned to that user. Yet another predetermined rule that the user filtration engine 308 may employ is that there should be permissible number of spatial movement data recorded in the dataset. In one example, the user filtration engine 308 may check, for each user device, if the number of spatial movement data transmitted to the behavior recognition system 102 for a predetermined time period of 30 days is at least ten geographical coordinates. The user filtration engine 308 may check if there are permissible number of spatial movement data transmitted and stored in the dataset in order to ensure that the adequate data is available for determining the parameters. In one example, the user filtration engine 308 may retain the user device that have geographical coordinates recorded for past 90 days. By employing the aforementioned rules, the user filtration engine 308 may generate a set.

Subsequently, for the members in the set of user devices, the spatial movement behavior may be assessed. In one example, the spatial movement behavior may be assessed by determining and assigning a mobility factor to the members in the set of user devices. Accordingly, in an example, the parameter determination engine 206 may determine a plurality of parameters for each member in the set. In one example, the parameter determined by the parameter determination engine 206 is an indicative of spatial movement behavior of the member. Further, the parameter determined for the member may include, as examples, number of geo-location partitions, total distance travelled by the user device, area and perimeter of the region within which the user has travelled in the predetermined time period.

According to an example, the parameter determination engine 206 may determine number of geo-location partitions for each member in the set. Geo-location partition may be a group of geographical coordinates within a predetermined radius. Further, the geo-location partitions depict number of different regions that the user travel within. In one example, number of different regions may indicate how far the user device travels. The parameter determination engine 206 may determine the number of geo-location regions by selecting a first geographical coordinate of the member recorded in the set. Thereafter, the parameter determination engine 206 may determine a first geo-location region of the predetermined radius that has the center at the first geographical coordinate. In one example, the predetermined radius can be 20 miles, 50 miles, 100 miles, or the like. Once the parameter determination engine 206 has determined, the geo-location region, the parameter determination engine 206 may determine if the next geographical coordinate lie in the gee-location region. In one example, the parameter determination engine 206 may measure a distance between the first geographical coordinate and the next geographical coordinate. The parameter determination engine 206 may measure the distance using Haversine formula.

In the illustrated example, the parameter determination engine 206 may measure a distance between each subsequent geographical coordinate and the first geographical coordinate to determine if the subsequent geographical coordinate is within the first geo-location region. In case the parameter determination engine 206 finds that the one of the geographical coordinate is more than the predetermined radius, the parameter determination engine 206 may form a second geo-location region using that geographical coordinate as the center and determines the second geo-location region of the radius equal to the predetermined radius. Thereafter, the parameter determination engine 206 may check if subsequent geographical coordinates are within the first geo-location region and the second geo-location region. In case the parameter determination engine 206 determines that another geographical coordinate does not lie in either the first or second geo-location regions, the parameter determination engine 206 may form a third geo-location region using that geographical coordinate. Further, the parameter determination engine 206 may continue to check if the other geographical coordinates lie within anyone of the formed geo-location regions. Once the parameter determination engine 206 has checked for all the geographical coordinates, the parameter determination engine 206 may record the number of geo-location regions formed and record the number as a first parameter for the member in the set of user devices in the parameter database 130. Further, the parameter determination engine 206 may perform the same activity for all other members until the number of geo-location regions for all the members are recorded. Once the parameter determination engine 206 has determined the first parameter, the parameter determination engine 206 may determine the other parameters.

According to an aspect, the parameter determination engine 206 may determine another parameter which may called as summary of the trip. In one example, the parameter determination engine 206 may determine total distance travelled by the member when carried along by the user. The parameter determination engine 206 may determine the summary by measuring and adding the distance between the two chronologically consecutive geographical coordinates to the previously determined distance between two chronologically consecutive geographical coordinates. In one example, the parameter determination engine 206 may determine a distance between a first geographical coordinate and the chronologically next geographical coordinate. For instance, the parameter determination engine 206 may determine the distance using Haversine formula. Thereafter, the parameter determination engine 206 may determine the distance between the second geographical coordinate and the chronologically next geographical coordinate. Once the distance is determined, the parameter determination engine 206 may add the distance to the previously determined distance. Further, the parameter determination engine 206 may perform the operation until the parameter determination engine 206 has added the distances between all chronologically consecutive geographical coordinates. Once the parameter determination engine 206 has determined the total distance, the parameter determination engine 206 may record the total distance as the second parameter. The parameter determination engine 206 may determine the total distance for each member and store the same in the parameter database 130.

According to an example, the parameter determination engine 206 may further determine another parameter as the longest single trip taken by the members of the set of user devices when carried by the user. In one example, the parameter determination engine 206 may determine the longest distance by comparing the previously determined distance between two chronologically consecutive geographical coordinates. The parameter determination engine 206 may then record the longest single trip as another parameter.

According to an example, the parameter determination engine 206 may determine yet another parameter as the number of trips that are more than a predefined length for each member of the set of user devices. For instance, the predetermined length can be 500 miles or 1000 miles. In the illustrated example, the parameter determination engine 206 may compare all the measure distance between chronologically consecutive geographical coordinates and determines the number of distances that are more than the predefined length. Once the parameter determination engine 206 has determined the number of trip that are more than predefined length, the parameter determination engine 206 may record the number as the parameter for the member of the set of user devices. The parameter determination engine 206 may perform the same activity for all the members of the set of user devices.

According to yet another example, the parameter determination engine 206 may determine other parameter as an area and parameter of a region encompassing the geographical coordinates of the member when carried by the user. In the illustrated example, the parameter determination engine 206 may determine a region that includes all the geographical coordinates recorded for the members of the set of user devices. The parameter determination engine 206 may use convex hull technique to determine the area in which the geographical coordinates may lie. In one example, the area can be a polygon that covers the geographical coordinates. In addition, the parameter determination engine 206 may also determine a perimeter of the determined area. Once the area and perimeter is recorded by the parameter determination engine 206 for one user device, the parameter determination engine 206 may store the area and the parameter in the parameter database 130 for the user device. The parameter determination engine 206 may then determine the area and distance for all other members.

In one example, the determined parameter may be processed by the behavior recognition engine 208 to assess the spatial movement behavior. The behavior recognition engine 208 may employ machine learning techniques to process the determined parameters for assessing the spatial movement behavior. In one example, the behavior recognition engine 208 may assess the spatial movement behavior by comparing the spatial movement behavior of different members of the set of user devices. In another example, the behavior recognition engine 208 may assess the spatial movement behavior by assigning the mobility factor to the members.

For instance, the behavior recognition engine 208 may process the parameter dataset to obtain the mobility factor. In one example, the behavior recognition engine 208 may use different machine learning techniques to obtain the parameter dataset. For instance, the behavior recognition engine 208 may use machine learning techniques, such as k-means clustering technique to form clusters of the users. The behavior recognition engine 208, in order to, assess the spatial movement may determine a cost associated with the user. Further, the cost may be determined using the parameter of the members of the set of user devices.

Although the current example talks about k-means clustering, the parameters may be processed by other machine learning techniques. In one example, the behavior recognition engine 208 may assess the spatial movement behavior in three steps. In first step, the behavior recognition engine 208 may form different sets of clusters in which the members of the set of user devices may be grouped randomly. Thereafter, in the second step, the behavior recognition engine 208 may determine a cost associated with each cluster. Further, the behavior recognition engine 208 may determine an overall cost of each set of clusters. Once the costs are determined, the behavior recognition engine 208 may determine a set of clusters that has lowest cost associated thereto. Once the set of clusters having the lowest overall cost is determined, the behavior recognition engine 208 may assess the spatial movement behavior by the members of the set of user devices in each cluster by performing a comparison between a set of parameters of one cluster with a set of parameters of other clusters. Further, the comparison between the cluster may provide indication to the spatial movement behavior of the members of the set of user devices in each cluster.

In one example, the behavior recognition engine 208 may start by forming random clusters of the members of the set of user devices. For instance, the behavior recognition engine 208 may iteratively generate a value of k that represents number of clusters to be formed. In one example, the value of k may vary from 2 to 10. In other words, the behavior recognition engine 208 may form number of clusters ranging from 2 to 10. For example, for the value of k=2, the behavior recognition engine 208 may form clusters. Further, for the first cluster, the behavior recognition engine 208 may randomly add the members of the set of user devices in one cluster. Thereafter, the behavior recognition engine 208 may group the rest number of members of the set of user devices in second cluster. Once the clusters are formed, the behavior recognition engine 208 may choose next value of k=3 and accordingly, the behavior recognition engine 208 may form 3 different clusters. In one example, the behavior recognition engine 208 may randomly add a number of members of the set of user devices in the first cluster. Further, the behavior recognition engine 208 may add another random number of the members of the set of user devices left ungrouped in the second cluster and finally, the behavior recognition engine 208 may add the remaining members of the set of user devices in the third cluster. The behavior recognition engine 208 may repeat the operation for each value of k until the value of k becomes 10.

Once the behavior recognition engine 208 has created the clusters, the behavior recognition engine 208 may calculate a cost factor associated with each cluster and an overall cost factor of all the clusters for each value of k. For example, for the value k=3, the behavior recognition engine 208 may calculate the cost factor the first, second, third cluster. In one example, the cost factor of the clusters is calculated by calculating the cost factor for each members of the set of user device in the cluster based on the determined parameters for that members of the set of user device. Accordingly, the behavior recognition engine 208 may calculate the cost factor for all members of the set of user devices in the cluster and sums up the cost factor of the grouped members of the set of user device to determine the cost factor of the first cluster. Once the cost factor of each clusters for the value of k, the behavior recognition engine 208 may determine the overall cost factor of the clusters for each value of k. The behavior recognition engine 208 may repeat the operation until the behavior recognition engine 208 determines the cost factor of each cluster and overall cost of all the clusters for each value of k. Further, the behavior recognition engine 208 may calculate the overall cost of the clusters for each value of k and temporarily store the overall costs in the mobility factor database 132 as long as the analysis is performed. Once the overall cost for all values of k are calculated, the behavior recognition engine 208 may determine the value of k for which the overall cost is minimum. In one example, the behavior recognition engine 208 may use elbow technique to determine the value of k for which the overall cost is minimum. The behavior recognition engine 208 may determine such value of k by determining a difference between two overall cost factors of consecutive values of k. For instance, the overall cost for value k=2 and k=3 are subtracted and checked if the difference is below a predefined threshold value. The predefined threshold value, in one example, can be 100. The behavior recognition engine 208 may keep calculating the difference until the difference comes below the predetermined threshold. Once the behavior recognition engine 208 determines that for the value of K the difference is below the threshold, the system may select that value of k as a value of k for which the cost factor is minimum. In one example, the determined value of is determined as $k_{Lower}$. In the illustrated example, the $k_{Lower}$ is the number of clusters in which the members of the set of user devices are classified in such a way that the overall cost associated with the members of the set of user devices is minimum.

Once the $k_{Lower}$ is determined, the behavior recognition engine 208 may assign mobility factor to each cluster. In other words, the mobility factor is assigned to the members of the set of user devices in each cluster. In one example, the behavior recognition engine 208 may assign mobility factor to the clusters in two steps. In first step, the behavior recognition engine 208 may determine main mobility parameters corresponding to the all the clusters of $k_{Lower}$. For example, the behavior recognition engine 208 may determine the mobility parameter for each cluster for $k_{Lower}$. In an example, the mobility parameters may resemble to the type of parameters that were computed for the members of the set of user devices. Further, the mobility parameters may be determined using the parameters of the all the members of the set of user devices in each cluster by averaging the parameters of the members of the set of user devices. Once the behavior recognition engine 208 has determined the mobility parameters of all the cluster, the behavior recognition engine 208 may add the mobility parameters of each cluster to obtain a pre-mobility factor of each cluster. In one example, the pre-mobility factor may be an arithmetical value and may be indicative of the spatial movement behavior of the members of the set of user devices in the cluster. Once the summations of the mobility parameters are determined, the behavior recognition engine 208 may sort the pre-mobility factor of the clusters to rank the clusters. For example, the behavior recognition engine 208 may arrange the pre-mobility parameters in ascending order. Further, the sorted pre-mobility factors may represent comparison of the spatial movement behavior of the members of the set of user devices in the clusters.

Once, the pre-mobility factors are sorted, the behavior recognition engine 208 may assign mobility factor to each cluster sorted based on the arithmetic value of the pre-mobility factor. In one example, the mobility factor is an integer whose value varies between one and $K_{Lower}$. For instance, the duster having lowest pre-mobility factor is assigned the mobility factor as one and the duster having next larger value is assigned mobility factor as two. Further, the behavior recognition engine 208 assigns the mobility factor to cluster having the highest pre-mobility factor as $K_{Lower}$. In one example, the assigned mobility factor is indicative of the spatial movement behavior of the members of the set of user devices in the clusters. For example, a high mobility factor indicates that the members of the set of user device is mobile or, in other words, the user carrying the members of the set of user device travels more. On the other hand, low mobility factor may indicate that the members of the set of user device is stationary or, in other words, the user carrying that members of the set of user device travels less. In one example, the mobility factor may be stored in the mobility factor database 132.

The mobility factors stored in the mobility factor database 132 may be accessed by the behavior recognition engine 208 to trigger a reconfiguration in the user devices connected to the behavior recognition system 102. In one example, the behavior recognition engine 208 may check for the user device whose mobility factor is high than a predetermined threshold. Accordingly, the behavior recognition engine 208 may send a trigger to those user devices so that the user device may toggle between the first state of operation and the second state of operation. For instance, the user device, upon receipt of the trigger, may change the state normal mode to battery saving mode or vice-versa. By doing so, the user device may now operate for a longer duration than before thereby catering the work of the user during his/her travel. In another instance, the behavior recognition engine 208 may also send a relay to a data-service provider to automatically upgrade the data plans of the user so that the user has adequate Internet data plan and calls to do the work.

In another example, the behavior recognition engine 208 may trigger a reconfiguration in the security settings of the user device based on the mobility factor. In one example, the behavior recognition engine 208 may change the security setting of the user devices based on the mobility factor. For instance, the behavior recognition engine 208 may send a trigger to the user devices that have high mobility factor so that the user device may be reconfigured to impose restrictions to the access to the connection ports of the user device. In addition, the user device may be reconfigured to prevent connection of insecure network to connect to the user device thereby preventing. Furthermore, the user device may be reconfigured to enhance the network security system, such as Firewall, to prevent any unwanted access to the user device or to prevent any data breach that may occur when the user devices to insecure network. On the other hand, the behavior recognition engine 208 may not send such reconfiguration triggers to the user devices that have lower mobility factor.

In yet another example, the behavior recognition engine 208 may also trigger back up of the data stored in the user device based on the mobility factor. In one example, the behavior recognition engine 208 may send a trigger to the user devices that have high mobility factor to back up the data to online servers. Such data back may be performed in order to safeguard the data in the user device in event of loss or theft of the user device.

In yet another example, the mobility factor may be used to determines the user devices that may need replacement of peripheral, such as battery. In addition, the mobility factor may be used to determine if the user needs additional peripheral. Further, the mobility factor may be used to allocate a user device to the user so that the allocated user device may cater the need of the user.

Figure 4:
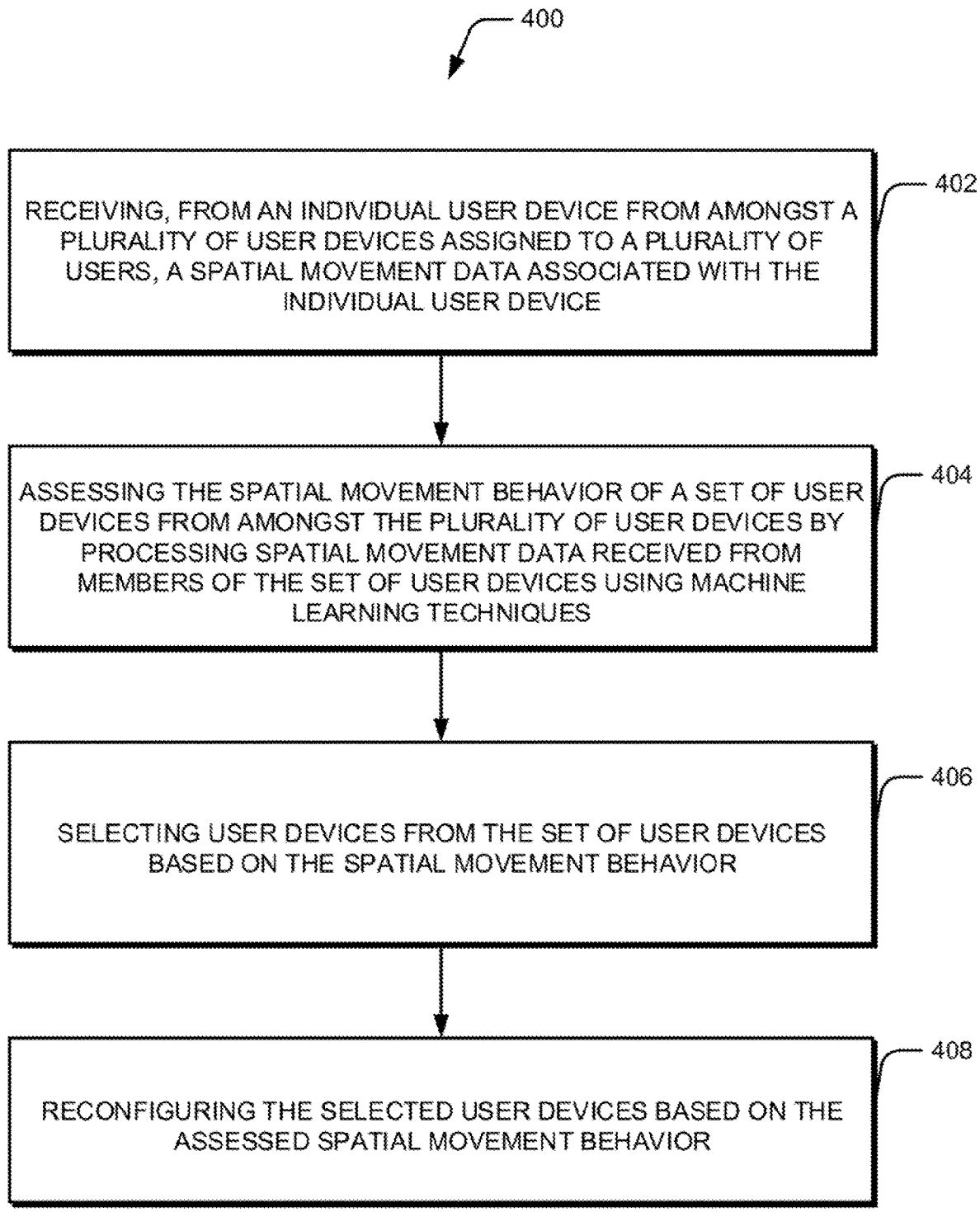
FIG. 4 illustrates a method for assigning mobility factor, according to an example.

FIG. 4 illustrates a method 400 for providing the resolution for the issue according to an example of the present subject matter. The method(s) may be described in the general context of computer executable instructions. Generally, computer executable instructions can include routines, programs, objects, components, data structures, procedures, engines, functions, etc., that perform particular functions or employ particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to employ the method 400, or an alternative method. Additionally, individual blocks may be deleted from the methods without departing from the spirit and scope of the subject matter described herein. Furthermore, the methods 400 can be employed in any suitable hardware, software, firmware, or combination thereof. The methods 400 is explained with reference to the behavior recognition system 102, however, the methods can be employed in other systems as well.

Referring to method 400, at block 402, the spatial movement data associated with individual user devices assigned to each of a plurality of users may be received. Once the spatial movement data is received, the method 400 moves to next block.

At block 404, spatial movement behavior of a set of user devices from the plurality of user devices may be assessed. In one example, the spatial movement behavior may be assessed by processing the spatial movement data received from the members of the set of user devices. Further, the spatial movement data may be processed using machine learning techniques.

At block 406, at least one user device may be selected for reconfiguration based on the assessed spatial movement behavior as explained with respect to FIG. 3. Once the user devices are selected, the method 400 moves to next block.

Finally, at block 408, the selected user devices are reconfigured based on the assessed spatial movement behavior. In one example, the reconfiguration can be performed as explained with reference to description of FIG. 3.

Figure 5:
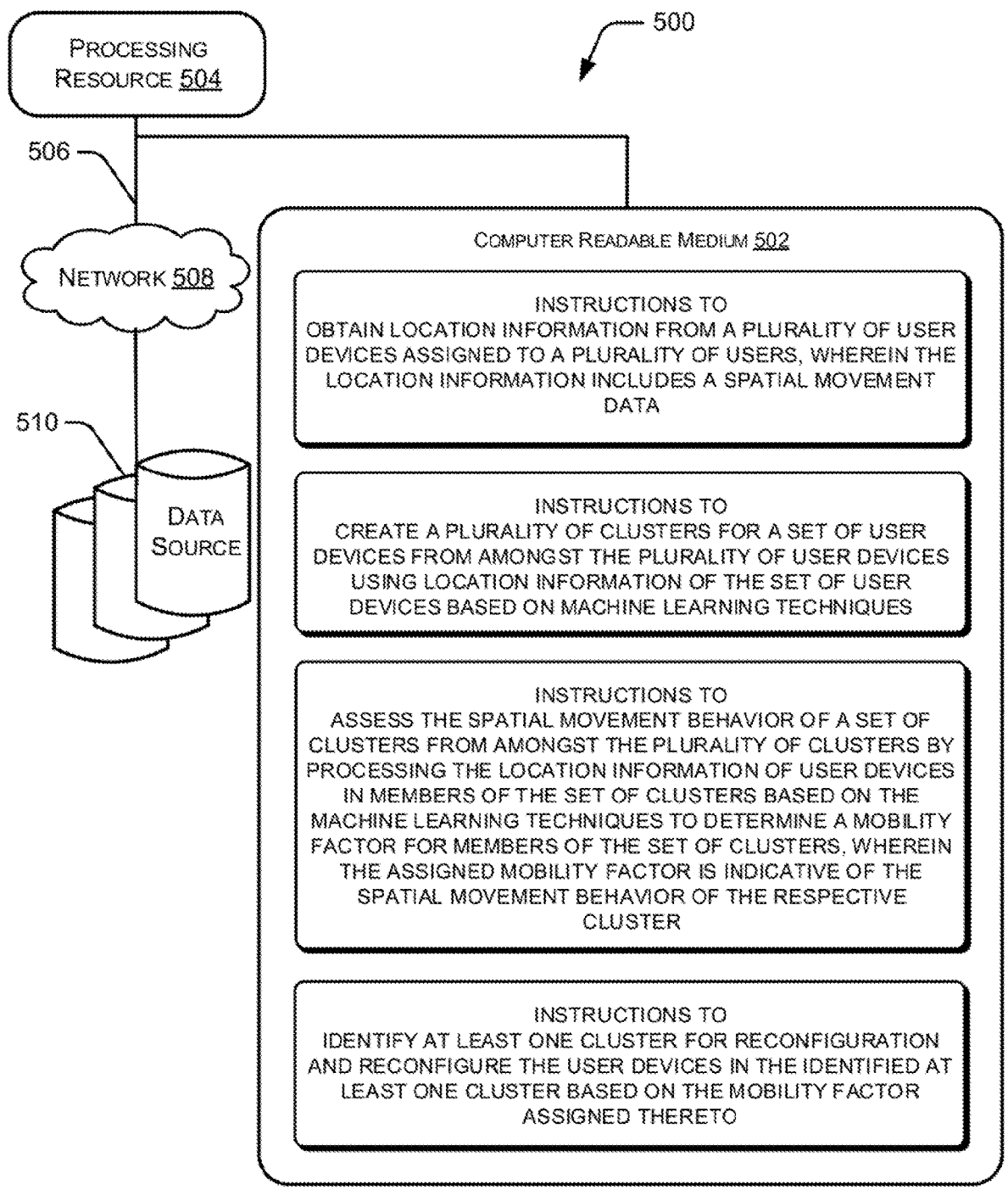
FIG. 5 illustrates a non-transitory computer readable medium, according to an example.

FIG. 5 illustrates an example network environment 500 using a non-transitory computer readable medium 502 to assign the mobility factor, according to an example of the present subject matter. The network environment 500 may be a public networking environment or a private networking environment. In one example, the network environment 500 includes a processing resource 504 communicatively coupled to the non-transitory computer readable medium 502 through a communication link 506.

For example, the processing resource 504 may be a processor of a computing system, such as, the behavior recognition system 102. The non-transitory computer readable medium 502 may be, for example, an internal memory device or an external memory device. In one example, the communication link 506 may be a direct communication link, such as one formed through a memory read/write interface. In another example, the communication link 506 may be an indirect communication link, such as one formed through a network interface. In such a case, the processing resource 504 may access the non-transitory computer readable medium 502 through a network 508. The network 508 may be a single network or a combination of multiple networks and may use a variety of communication protocols.

The processing resource 54 and the non-transitory computer readable medium 502 may also be communicatively coupled to data sources 510 over the network 508. The data sources 510 may include, for example, databases and computing devices. The data sources 510 may be used by the database administrators and other users to communicate with the processing resource 504.

In one example, the non-transitory computer readable medium 502 includes a set of computer readable and executable instructions, such as the data acquisition engine 204. The set of computer readable instructions, referred to as instructions hereinafter, may be accessed by the processing resource 504 through the communication link 506 and subsequently executed to perform acts for network service insertion.

For discussion purposes, the execution of the instructions by the processing resource 504 has been described with reference to various components introduced earlier with reference to description of FIG. 3.

On execution by the processing resource 504, the data acquisition engine 204 may obtain location information of the plurality of user devices assigned to the plurality of users. Further, the behavior recognition engine 208 may create a plurality of clusters of a set of user devices from the plurality of user devices using machine learning techniques. Once the clusters are formed, the behavior recognition engine 208 may assess the spatial movement behavior of a set of clusters from the clusters previously created. In one example, the behavior recognition engine 208 may assess the spatial movement behavior of each cluster by processing the location information of the members of the set of user devices inside that cluster. Further, the location information may be processed using machine learning techniques. Once the location information is processed for each cluster, the behavior recognition engine 208 may assign a mobility factor to each cluster, Finally, the behavior recognition engine 208 may select at least one cluster in order to reconfigure the user devices in the clusters. In one example, the behavior recognition engine 208 may select the cluster based on the assigned mobility factor as explained with respect to FIG. 3. Once selected, the behavior recognition engine 208 may reconfigure the user devices in the cluster in a manner explained with respect to FIG. 3.

Although aspects for methods and systems for resolving issues have been described in a language specific to structural features and/or methods, the invention is not necessarily limited to the specific features or methods described. Rather, the specific features and methods are disclosed as examples for assigning the mobility factor.

We claim:
1. A method comprising:
 receiving, from an individual user device from amongst a plurality of user devices assigned to a plurality of users, a spatial movement data associated with the individual user device;
 assessing spatial movement behavior of a set of user devices from amongst the plurality of user devices by processing the spatial movement data received from members of the set of user devices using machine learning;
 grouping user devices from the set of user devices into clusters based on the spatial movement data of the individual user devices using k-means clustering such that user devices with similar spatial movement data are in a same cluster of the clusters;
 assigning a mobility factor to each cluster of the clusters, wherein the mobility factor is a numerical indication of the spatial movement behavior of user devices within the cluster;
 selecting user devices from the set of user devices a first cluster of the clusters based on the spatial movement behavior mobility factor of the first cluster being higher than a predetermined threshold; and
 reconfiguring the selected user devices based on the mobility factor assigned thereto the assessed spatial movement behavior.

2. The method as claimed in claim 1, further comprising filtering identifying the set of the user devices from the plurality of user devices based on predefined rules.

3. The method as claimed in claim 2, further comprising determining, for the user devices in the set of the user devices, a plurality of parameters based on the spatial movement data of user devices in the set, wherein the plurality of parameters are indicative of a spatial movement behaviors of the user devices.

4. The method as claimed in claim 2, wherein the predefined rules comprise at least one of predefined number of user devices associated with a user, user devices sharing similar attribute, spatial movement data gathered from user devices for a predetermined time period, overlap of the spatial movement data from user devices sharing similar attribute assigned to a user, and a combination thereof.

5. The method as claimed in claim 2, wherein a predefined rule of the predefined rules excludes user devices for which there is less than a threshold amount of spatial movement data from being included in a cluster of the clusters.

6. The method as claimed in claim 2, wherein a predefined rule of the predefined rules excludes user devices for which there is more than predetermined number of user devices associated with a single user from being included in a cluster of the clusters.

7. The method as claimed in claim 1, wherein the reconfiguring comprises changing a mode of operation of the selected user devices between a first mode of operation and a second mode of operation based on the assessment.

8. The method as claimed in claim 1, further comprising wherein grouping sets of user devices into clusters comprises creating a plurality of clusters of user devices in the set using k-means clustering to assign a mobility factor to members of the plurality of clusters and ranking the plurality of the clusters based on the assigned mobility factors.

9. The method as claimed in claim 3, wherein the plurality of parameters comprises number of geo-location partitions, total distance travelled by the user over a predetermined time period, and an area and a perimeter within which individual user device has travelled in a predetermined time period.

10. The method as claimed in claim 1, wherein reconfiguring the user devices comprises placing the user devices in a power saving mode based on the mobility factor.

11. The method as claimed in claim 1, wherein reconfiguring the user devices comprises reconfiguring a security setting of the user devices based on the mobility factor.

12. A behavior recognition system comprising:
a data acquisition engine to receive a location information, at predetermined intervals, from members of a plurality of user devices assigned to a plurality of users, wherein the location information includes a spatial movement data along with time stamps of transmission of the spatial movement data; and
a parameter determination engine to determine a plurality of parameters for a set of user devices from amongst the plurality of user devices based on the spatial movement data of members of the set of user devices, wherein the plurality of parameters is indicative of a spatial movement behavior of the members of the set of user devices; and
a behavior recognition engine to:
group user devices from the set of user devices into clusters based on the spatial movement data of the plurality of user devices using k-means clustering such that user devices with similar spatial movement data are in a same cluster of the clusters;
assign mobility factors to each cluster of the clusters, wherein:
the mobility factor is indicative of the spatial movement behavior of user devices within the cluster; and
the mobility factors are incrementally assigned as integer values to clusters based on a ranked order of mobility of the clusters;
identify at least one user device from the set a first cluster of the clusters of user devices for reconfiguration based on the mobility factors factor for the first cluster being higher than a predetermined threshold; and
reconfigure the at least one user device based on the mobility factor assigned thereto.

13. The behavior recognition system as claimed in claim 12, wherein the mobility factor is a numerical value.

14. The behavior recognition system as claimed in claim 12 further comprising a user filtration engine to filter out identify the set of user devices from the plurality of user devices based on predefined rules.

15. The behavior recognition system as claimed in claim 12 wherein the behavior recognition engine is to reconfigure the at least one user device by changing mode of operation between a first mode of operation and a second mode of operation based on the assigned mobility factor.

16. The behavior recognition system as claimed in claim 14, wherein the predefined rules comprise at least one of predefined number of user devices associated with a user, overlap of the spatial movement data from user devices sharing similar attribute assigned to a user, and a combination thereof.

17. The behavior recognition system as claimed in claim 12, wherein the plurality of parameters comprises a number of geo-location partitions, total distance travelled by the user, and an area and a perimeter within which individual user device has travelled in a predetermined time period.

18. A non-transitory computer-readable medium comprising computer-readable instructions providing ranking to a plurality of users, which, when executed by a processing resource, cause the processing resource to:
obtain location information from user devices from amongst a plurality of user devices assigned to the plurality of users, wherein the location information includes spatial movement data;
using machine learning:
assess spatial movement behavior of a set of user devices from amongst the plurality of user devices by processing the spatial movement data received from members of the set of user devices;
create different sets of clusters of user devices and associated location information in which user devices are grouped randomly, wherein the different sets have different numbers of user devices;
determine a cost associated with each cluster based on the location information;
determine an overall cost associated with each set of clusters;
determine a set of clusters with a lowest overall cost;
group user devices from the set of user devices into clusters based on the spatial movement data of the user devices using k-means clustering such that user devices with similar spatial movement data are in a same cluster of the clusters the set of clusters with the lowest overall cost;
assign a mobility factor to each cluster of the set of clusters with the lowest overall cost, wherein the assigned mobility factor is indicative of spatial movement behavior of user devices within the cluster the respective cluster;
categorize a mobility of the set of clusters relative to other clusters; and
identify select user devices from a first cluster of the clusters based on the mobility factor of the first cluster being higher than a predetermined threshold; at least one cluster for reconfiguration and
reconfigure the selected user devices in the identified at least one cluster based on the mobility factor assigned thereto.

19. The non-transitory computer-readable medium as claimed in claim 18, wherein the non-transitory computer-readable medium includes further instructions to filter identify user devices based on predefined rules, to obtain the set of user devices, wherein the predefined rules comprise at least one of predefined number of user devices associated with a user, user devices sharing similar attribute, spatial movement data gathered from user devices for a predetermined time period, overlap of the spatial movement data from user devices sharing similar attribute assigned to a user, and a combination thereof.

* * * * *